(12) United States Patent　　　(10) Patent No.:　US 12,679,050 B2

Louie　　　　　　　　　　　　　　(45) Date of Patent:　　　Jul. 14, 2026

(54) VACUUM BAG SEALING SYSTEM

(71) Applicant: The Boeing Company, Arlington, VA (US)

(72) Inventor: Michael Kenneth-Que Louie, Renton, WA (US)

(73) Assignee: The Boeing Company, Arlington, VA (US)

( * ) Notice: Subject to any disclaimer, the term of this patent is extended or adjusted under 35 U.S.C. 154(b) by 188 days.

(21) Appl. No.: 18/335,350

(22) Filed: Jun. 15, 2023

(65) Prior Publication Data

US 2024/0416598 A1　　Dec. 19, 2024

(51) Int. Cl.
　　*B29C 70/44*　　　　(2006.01)
　　*B29C 70/54*　　　　(2006.01)
　　*B29L 31/30*　　　　(2006.01)

(52) U.S. Cl.
　　CPC ............ *B29C 70/44* (2013.01); *B29C 70/544* (2021.05); *B29L 2031/3076* (2013.01)

(58) Field of Classification Search
　　None
　　See application file for complete search history.

(56) References Cited

U.S. PATENT DOCUMENTS

| | | | |
|---|---|---|---|
| 9,833,981 B2 | 12/2017 | Louie et al. | |
| 10,807,349 B2 | 10/2020 | Louie et al. | |
| 2010/0112117 A1* | 5/2010 | Ross .................... | B29C 70/548 |
| | | | 425/388 |
| 2015/0217487 A1* | 8/2015 | Louie ........................ | B32B 5/00 |
| | | | 428/35.2 |
| 2018/0050529 A1* | 2/2018 | Louie ................ | B65D 81/2023 |

FOREIGN PATENT DOCUMENTS

| | | |
|---|---|---|
| AU | 2014340674 A1 | 4/2016 |
| EP | 2902176 B1 | 8/2015 |

OTHER PUBLICATIONS

Extended European Search Report, dated Oct. 16, 2024, regarding EP Application No. 24174833.4, 10 pages.
European Patent Office Action, dated Sep. 30, 2025, regarding EP Application No. 24174833.4, 10 pages.

* cited by examiner

*Primary Examiner* — Christopher T Schatz
(74) *Attorney, Agent, or Firm* — Yee & Associates, P.C.

(57)　　　　　　ABSTRACT

A vacuum bag sealing system comprises a bagging sheet comprising a sealing surface; a first interlocking strip connected to the sealing surface of the bagging sheet and forming a continuous perimeter connected to the sealing surface; a second interlocking strip between the first interlocking strip and the sealing surface of the bagging sheet in one portion of the perimeter, the second interlocking strip forming a continuous bladder perimeter.

20 Claims, 9 Drawing Sheets

VACUUM BAG SEALING SYSTEM

BACKGROUND INFORMATION

1. Field

The present disclosure generally relates to methods and equipment for fabricating composite resin parts, and deals more particularly with a vacuum bag sealing system for curing composite parts.

2. Background

Composite resin parts may be cured within an autoclave that applies heat and pressure to the part during a cure cycle. Some part geometries include internal cavities that may cause the part to collapse under autoclave pressure unless a tool such as an inflatable bladder is placed in the cavity. Such an inflatable bladder may be inflated during a cure process so as to react to the autoclave pressure force applied to the part. Typically, these inflatable bladders are pressurized by venting them to the autoclave pressure through a vacuum bag.

Venting through the vacuum bag requires additional sealing which can take an undesirable amount of time and generate waste from seals and disposable vacuum bags. Additionally, failure to properly vent through the vacuum bag can result in the bladder failing to pressurize and undesirably affecting the resulting composite part quality.

Therefore, it would be desirable to have a method and apparatus that takes into account at least some of the issues discussed above, as well as other possible issues.

SUMMARY

An embodiment of the present disclosure provides a vacuum bag sealing system. The vacuum bag sealing system comprises a bagging sheet comprising a sealing surface; a first interlocking strip connected to the sealing surface of the bagging sheet and forming a continuous perimeter connected to the sealing surface; and a second interlocking strip between the first interlocking strip and the sealing surface of the bagging sheet in one portion of the continuous perimeter, the second interlocking strip forming a continuous bladder perimeter.

An embodiment of the present disclosure provides a method for vacuum bag sealing a composite part. A bagging sheet is releasably joined to a forming tool. The bagging sheet is releasably joined to a bladder.

An embodiment of the present disclosure provides a method for vacuum bag sealing a composite part. A bagging sheet is sealed to a forming tool using interlocking strips. A bagging sheet is sealed to a bladder using interlocking strips. A vacuum is pulled beneath the bagging sheet after sealing the bagging sheet to the forming tool and sealing the bagging sheet to the bladder.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
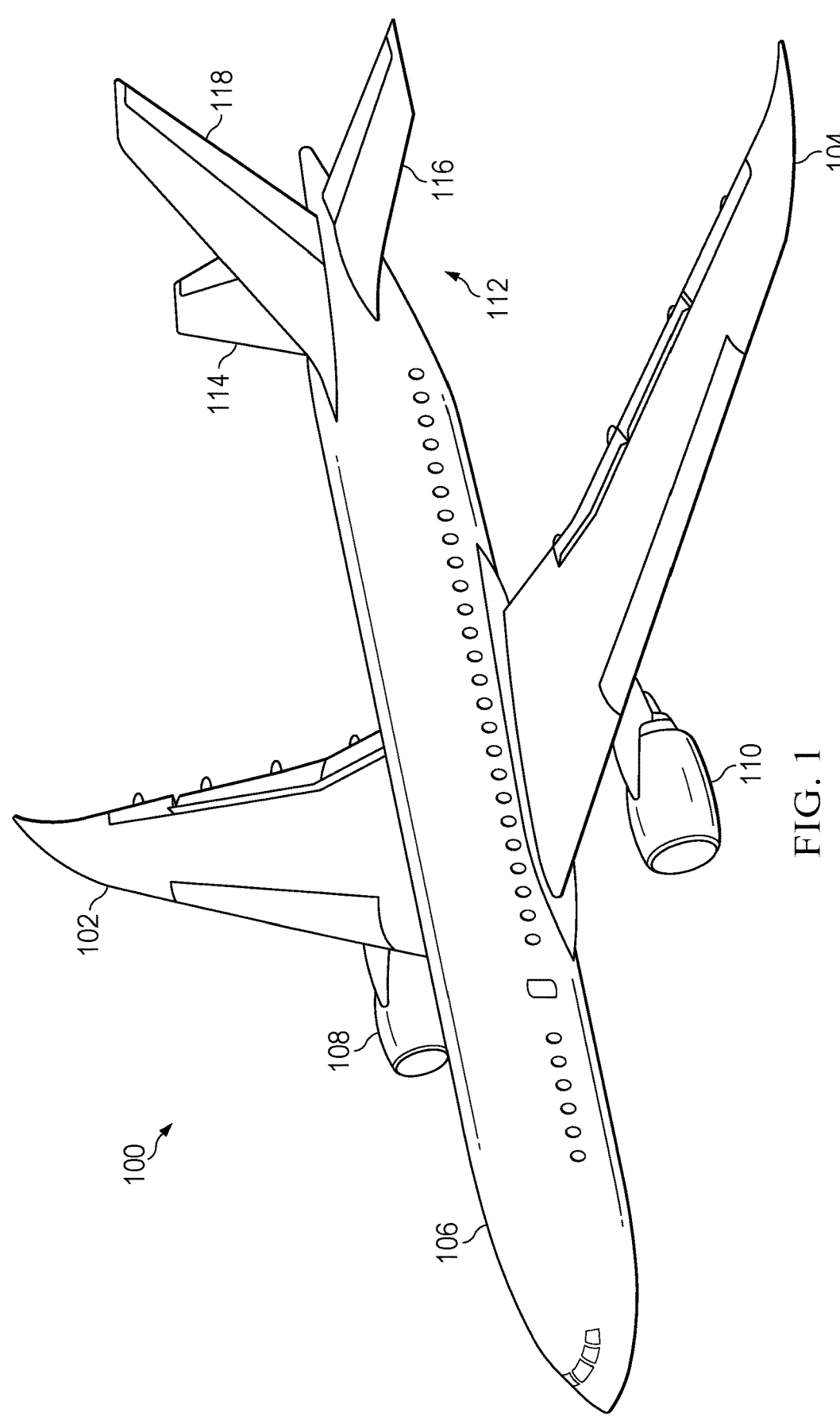
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite components formed using the vacuum bag sealing system of the illustrative examples. For example, portions of at least one of wing 102, wing 104, or body 106 can be cured using the vacuum bag sealing system of the illustrative examples.

Figure 2:
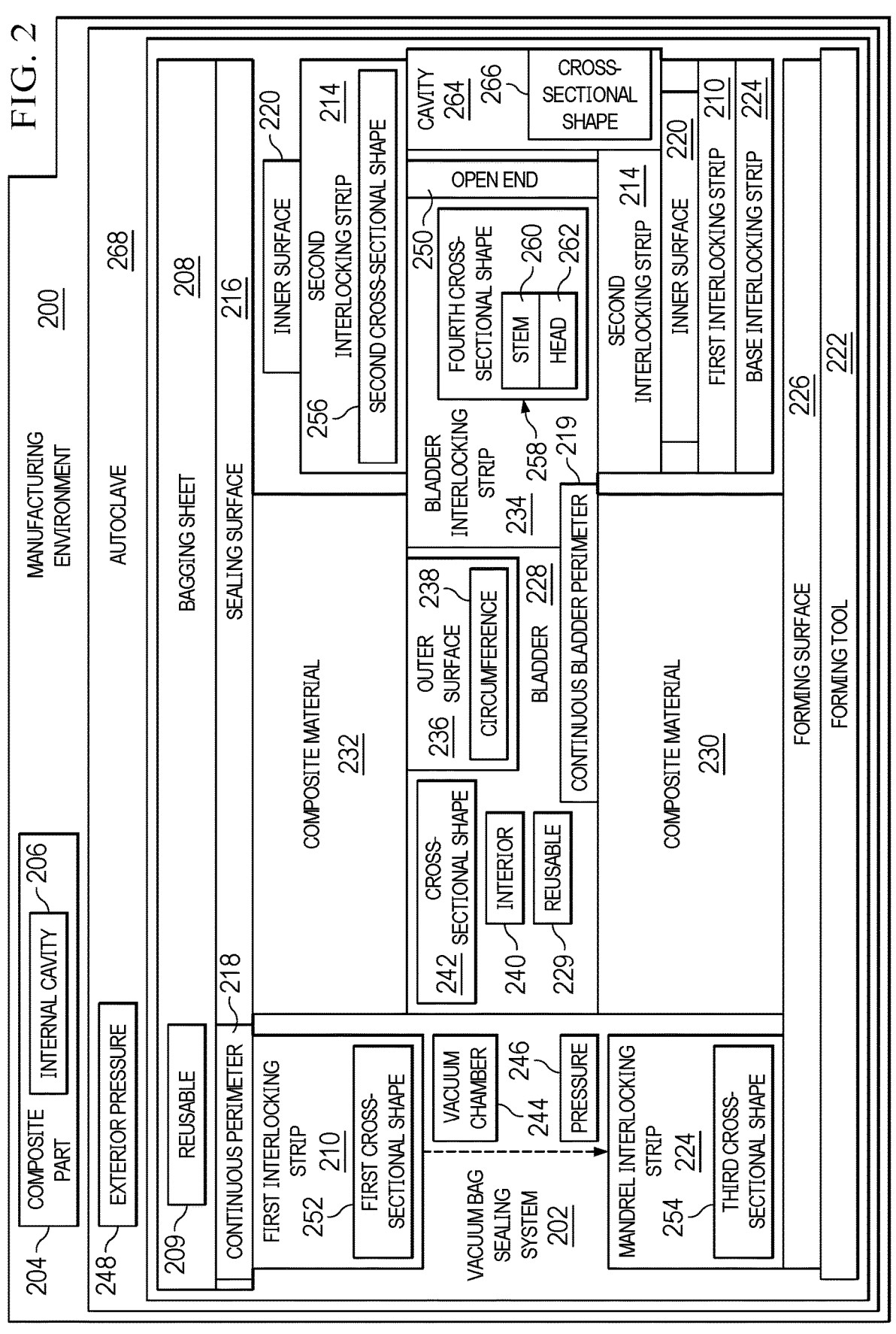
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Vacuum bag sealing system 202 can be used to cure a composite part of aircraft 100. Vacuum bag sealing system 202 in manufacturing environment 200 can be used in curing composite part 204 with internal cavity 206.

Vacuum bag sealing system 202 comprises bagging sheet 208, first interlocking strip 210, and second interlocking strip 214. Bagging sheet 208 comprises sealing surface 216. First interlocking strip 210 is connected to sealing surface 216 of bagging sheet 208 and forms continuous perimeter 218 connected to sealing surface 216.

In some illustrative examples, bagging sheet 208 is reusable 209. When bagging sheet 208 is reusable 209, bagging sheet 208 can be used for multiple separate cure cycles.

Second interlocking strip 214 is between first interlocking strip 210 and sealing surface 216 of bagging sheet 208 in one portion of continuous perimeter 218. Second interlocking strip 214 is associated with sealing surface 216 of bagging sheet 208 and forms continuous bladder perimeter 219.

Second interlocking strip 214 can have any desirable thickness. In some illustrative examples, second interlocking strip 214 includes additional material to position functional portions of second interlocking strip 214 for a desirable location of bladder 228. Second interlocking strip 214 forms inner surface 220. In some of these illustrative examples, second interlocking strip 214 comprises a stem extending from inner surface 220 and a head on the end of the stem.

Each respective interlocking strip, such as one of first interlocking strip 210, second interlocking strip 214, mandrel interlocking strip 224, and bladder interlocking strip 234, is configured to join sections of vacuum bag sealing system 202 to form a substantially airtight seal. For example, a respective interlocking strip of first interlocking strip 210, second interlocking strip 214, mandrel interlocking strip 224, and bladder interlocking strip 234 includes a cross-sectional shape configured to interlock (e.g., snap lock) another interlocking strip of first interlocking strip 210, second interlocking strip 214, mandrel interlocking strip 224, and bladder interlocking strip 234. In some of these illustrative examples, second interlocking strip 214 is a female strip configured to accept portions of bladder interlocking strip 234.

In this illustrative example, vacuum bag sealing system 202 further comprises forming tool 222. Forming tool 222 can also be referred to as a tool or a mandrel in some illustrative examples. In some illustrative examples, forming tool 222 can be referred to as a layup mandrel or a curing tool. In some illustrative examples, composite material 230 is laid up on forming tool 222.

Mandrel interlocking strip 224 is connected to forming surface 226 of forming tool 222. Mandrel interlocking strip 224 and first interlocking strip 210 are configured to join bagging sheet 208 and forming tool 222 along an entirety of continuous perimeter 218 to seal bagging sheet 208 against forming tool 222.

Bladder 228 is configured to provide compression to a composite material, such as composite material 230 or composite material 232, during curing. Interior 240 of bladder 228 is pressurized to maintain cross-sectional shape 242 of bladder 228. Bladder 228 provides support to composite material 232 during curing to form internal cavity 206.

In some illustrative examples, bladder 228 is reusable 229. When bladder 228 is reusable 229, bladder 228 can be used for multiple separate cure cycles.

Bladder interlocking strip 234 is connected to outer surface 236 of bladder 228 and surrounds circumference 238 of bladder 228. Bladder interlocking strip 234 and second interlocking strip 214 are configured to join bagging sheet 208 and bladder 228 along an entirety of circumference 238 of bladder 228 to seal bagging sheet 208 against bladder 228.

Sealing bagging sheet 208 to forming tool 222 and sealing bagging sheet 208 to bladder 228 forms vacuum chamber 244. Vacuum chamber 244 is a sealed volume between bagging sheet 208 and forming surface 226 of forming tool 222. Vacuum chamber 244 has pressure 246 that can be controlled separately from a pressure outside of vacuum chamber 244.

Bladder 228 is sealed to bagging sheet 208 so that interior 240 can receive exterior pressure 248 while vacuum chamber 244 has pressure 246 separately controlled from exterior pressure 248. Exterior pressure 248 is supplied to interior 240 of bladder 228 through open end 250 of bladder 228.

First interlocking strip 210 comprises first cross-sectional shape 252, and first cross-sectional shape 252 is configured to interlock with mandrel interlocking strip 224 connected to forming tool 222. In some illustrative examples, first cross-sectional shape 252 and third cross-sectional shape 254 of mandrel interlocking strip 224 are the same.

Second interlocking strip 214 comprises second cross-sectional shape 256, and second cross-sectional shape 256 is configured to interlock with bladder interlocking strip 234 connected to outer surface 236 of bladder 228. In some illustrative examples, first cross-sectional shape 252 is different from second cross-sectional shape 256. In some illustrative examples, first cross-sectional shape 252 is the same as second cross-sectional shape 256. In some illustrative examples, second cross-sectional shape 256 and fourth cross-sectional shape 258 of bladder interlocking strip 234 are the same. In some illustrative examples, second cross-sectional shape 256 and fourth cross-sectional shape 258 are different. In some illustrative examples, second cross-sectional shape 256 is an opposite shaped seal to fourth cross-sectional shape 258.

In some illustrative examples, one of second cross-sectional shape 256 or fourth cross-sectional shape 258 of bladder interlocking strip 234 comprises a stem and a head disposed at the end of the stem. As depicted, bladder interlocking strip 234 comprises stem 260 and head 262. Head 262 is disposed at the end of stem 260. In some illustrative examples, second interlocking strip 214 forms cavity 264 having cross-sectional shape 266 the same as cross-sectional shape 242 of bladder 228. By cross-sectional shape 266 being the same as cross-sectional shape 242, open end 250 is held open to allow exterior pressure 248 to interior 240 of bladder 228.

The illustrative examples utilize a circumferential seal, bladder interlocking strip 234, around bladder 228 and seals to second interlocking strip 214 on an elastomeric vacuum bag, bagging sheet 208. Sealing using second interlocking strip 214 allows for a tight seal between bladder 228 and bagging sheet 208. Sealing using second interlocking strip 214 allows for venting of bladder 228 during autoclave cure.

After sealing bladder 228 to bagging sheet 208 and sealing bagging sheet 208 to forming tool 222, vacuum bag sealing system 202 can be placed into autoclave 268. Autoclave 268 can apply exterior pressure 248 to vacuum bag sealing system 202 while vacuum is supplied to vacuum chamber 244.

Vacuum bag sealing system 202 and methods of use enable use of bagging sheet 208 for composite curing. The illustrative examples enable high rate manufacturing. Using bagging sheet 208 reduces time sealing the vacuum bag. Pressurizing interior 240 of bladder 228 through open end 250 enables use of bagging sheet 208. The illustrative examples increase sustainability of composite curing. Use of interlocking strips to seal bagging sheet 208 and bladder 228 and provide pressurization to bladder 228 can provide at least one of reduced preparation time for sealing bagging sheet 208 to forming tool 222, reduced cost, or increased sustainability by using fewer disposable resources.

Each interlocking strip, first interlocking strip 210, second interlocking strip 214, mandrel interlocking strip 224, and bladder interlocking strip 234 may be fabricated from any material suitable for withstanding autoclave curing temperatures. In some illustrative examples, first interlocking strip 210, second interlocking strip 214, mandrel interlocking strip 224, and bladder interlocking strip 234 may be fabricated from any material suitable for withstanding temperatures up to 850° C. The interlocking strips can be bonded to the respective component by any suitable method. In some illustrative examples, at least one of the interlocking strips can be heat welded to a surface. For example, first interlocking strip 210 can be heat welded to bagging sheet 208. In some illustrative examples, one of the interlocking strips can be adhered to a component of vacuum bag sealing system 202 using an adhesive or a sealing tape. In one illustrative example, mandrel interlocking strip 224 is adhered to forming surface 226 of forming tool 222.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although forming surface 226 appears planar, forming surface 226 can have any desirable geometry. In some illustrative examples, when forming surface 226 is substantially planar, composite material 230 can be cured into a composite skin. In some illustrative examples, when forming surface 226 has a trough or other geometric feature, composite material 230 can be cured to form a stiffener with internal cavity 206.

Composite material 232 can be cured to form either a composite skin or a composite stiffener, depending upon the design of forming tool 222. Bladder 228 is configured to apply pressure to internal cavity 206 of composite part 204 during autoclave curing. The geometry of forming tool 222 and bladder 228 can be modified to form composite part 204 having any desirable design with internal cavity 206.

As another example, an interface mold can be positioned between second interlocking strip 214 and bagging sheet 208. An interface mold can take the form of a positioning piece connected to bagging sheet 208. An interface mold can position bladder 228 within vacuum chamber 244. By using an interface mold, a standard interlocking strip can be used for second interlocking strip 214 regardless of a size and shape of bladder 228. In these illustrative examples, second interlocking strip 214 can be connected to the interface mold and the interface mold can be connected to bagging sheet 208 and first interlocking strip 210.

Figure 3:
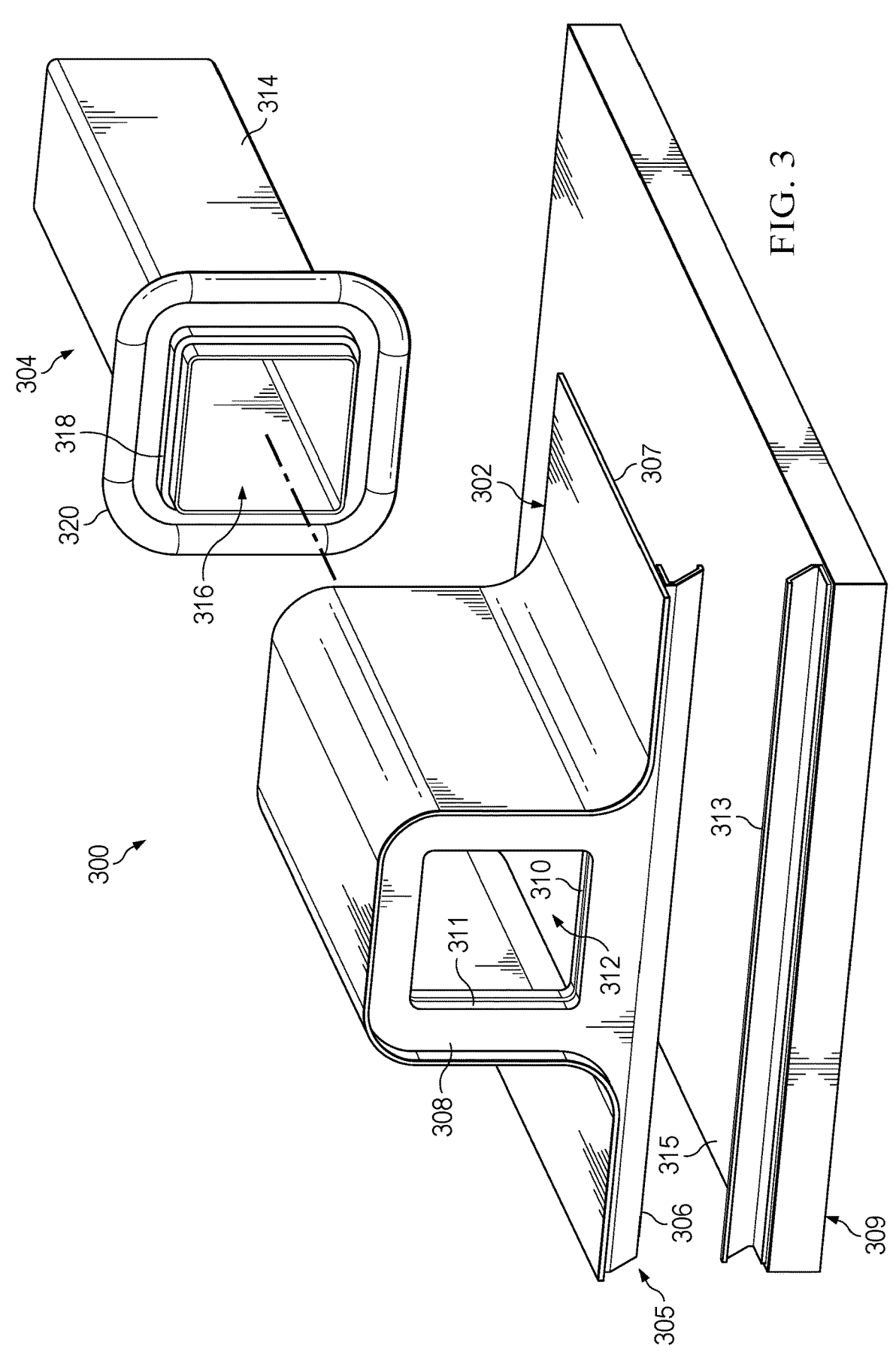
FIG. 3 is an illustration of an isometric view of an end of a bladder to be sealed to a bagging sheet in accordance with an illustrative embodiment.

Turning now to FIG. 3, an illustration of an isometric view of an end of a bladder to be sealed to a bagging sheet is depicted in accordance with an illustrative embodiment. In view 300, bagging sheet 302 and bladder 304 are present. bagging sheet 302 is a physical implementation of bagging sheet 208 of FIG. 2. bladder 304 is a physical implementation of bladder 228 of FIG. 2.

Reusable bagging sheet 302 comprises sealing surface 307. First interlocking strip 306 is connected to sealing surface 307 of bagging sheet 302 and forms continuous perimeter 305 connected to sealing surface 307. In view 300, first interlocking strip 306 is directly connected to sealing surface 307 in portions of continuous perimeter 305. In view 300, first interlocking strip 306 is indirectly connected to sealing surface 307 where second interlocking strip 310 is located. Second interlocking strip 310 is configured to seal bladder 304 to bagging sheet 302. Second interlocking strip

310 is between first interlocking strip 306 and sealing surface 307 of the bagging sheet in one portion of continuous perimeter 305.

Sealing surface 307 faces forming tool 309 when vacuum sealing a composite material for curing. Sealing surface 307 will be inside of a vacuum chamber when bagging sheet 302 is sealed to forming tool 309 and bladder is sealed to bagging sheet 302 to form a vacuum chamber.

In this illustrative example, second interlocking strip 310 forms inner surface 311. Second interlocking strip 310 forms a continuous bladder perimeter. Inner surface 311 forms cavity 312 having a cross-sectional shape the same as a cross-sectional shape of bladder 304. Material 308 is positioned between inner surface 311 and first interlocking strip 306. In some illustrative examples, material 308 is part of second interlocking strip 310. In other illustrative examples, material 308 can be part of an interface mold connected to bagging sheet 302 and positioned between second interlocking strip 310 and bagging sheet 302. In yet other illustrative examples, material 308 can be part of bagging sheet 302. Material 308 is positioned between sealing surface 307 and first interlocking strip 306 in the depicted portion of the perimeter.

Mandrel interlocking strip 313 is connected to forming surface 315 of forming tool 309. Mandrel interlocking strip 313 and first interlocking strip 306 is configured to join bagging sheet 302 and forming tool 309 along an entirety of the perimeter to seal bagging sheet 302 against forming tool 309.

Bladder 304 is configured to provide compression to a composite material during curing. Bladder interlocking strip 320 is connected to outer surface 314 of bladder 304 and surrounding circumference 318 of the bladder. Bladder interlocking strip 320 and second interlocking strip 310 are configured to join bagging sheet 302 and bladder 304 along an entirety of circumference 318 of bladder 304 to seal bagging sheet 302 against bladder 304.

Sealing bladder 304 to bagging sheet 302 leaves interior 316 of bladder 304 open to the exterior of the vacuum chamber. Interior 316 of bladder will be accessible through cavity 312.

Figure 4:
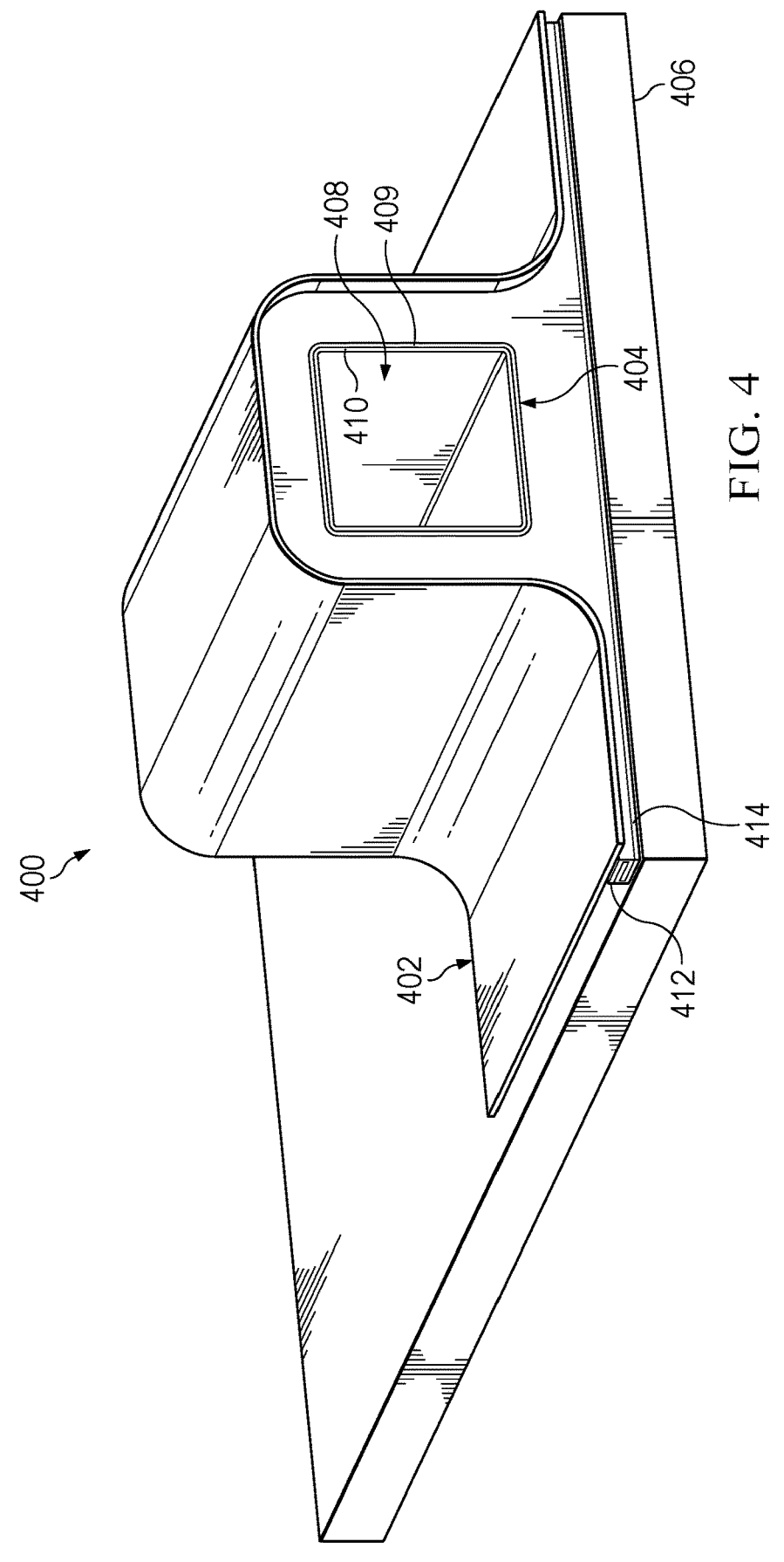
FIG. 4 is an illustration of an isometric view of a bladder sealed to a bagging sheet in accordance with an illustrative embodiment.

Turning now to FIG. 4, an illustration of an isometric view of a bladder sealed to a bagging sheet in accordance with an illustrative embodiment. In view 400, bagging sheet 402 is sealed to bladder 404 and forming tool 406. Bagging sheet 402 is a physical implementation of bagging sheet 208 of FIG. 2. Bladder 404 is a physical implementation of bladder 228 of FIG. 2.

In view 400, interior 408 of bladder 404 is exposed to allow pressure to enter interior 408. A vacuum chamber is formed between bagging sheet 402 and forming tool 406. Second interlocking strip 409 and bladder interlocking strip 410 are joined to seal bagging sheet 402 to an exterior of bladder 404. First interlocking strip 412 and mandrel interlocking strip 414 are joined to seal bagging sheet 402 to forming tool 406.

Figure 5:
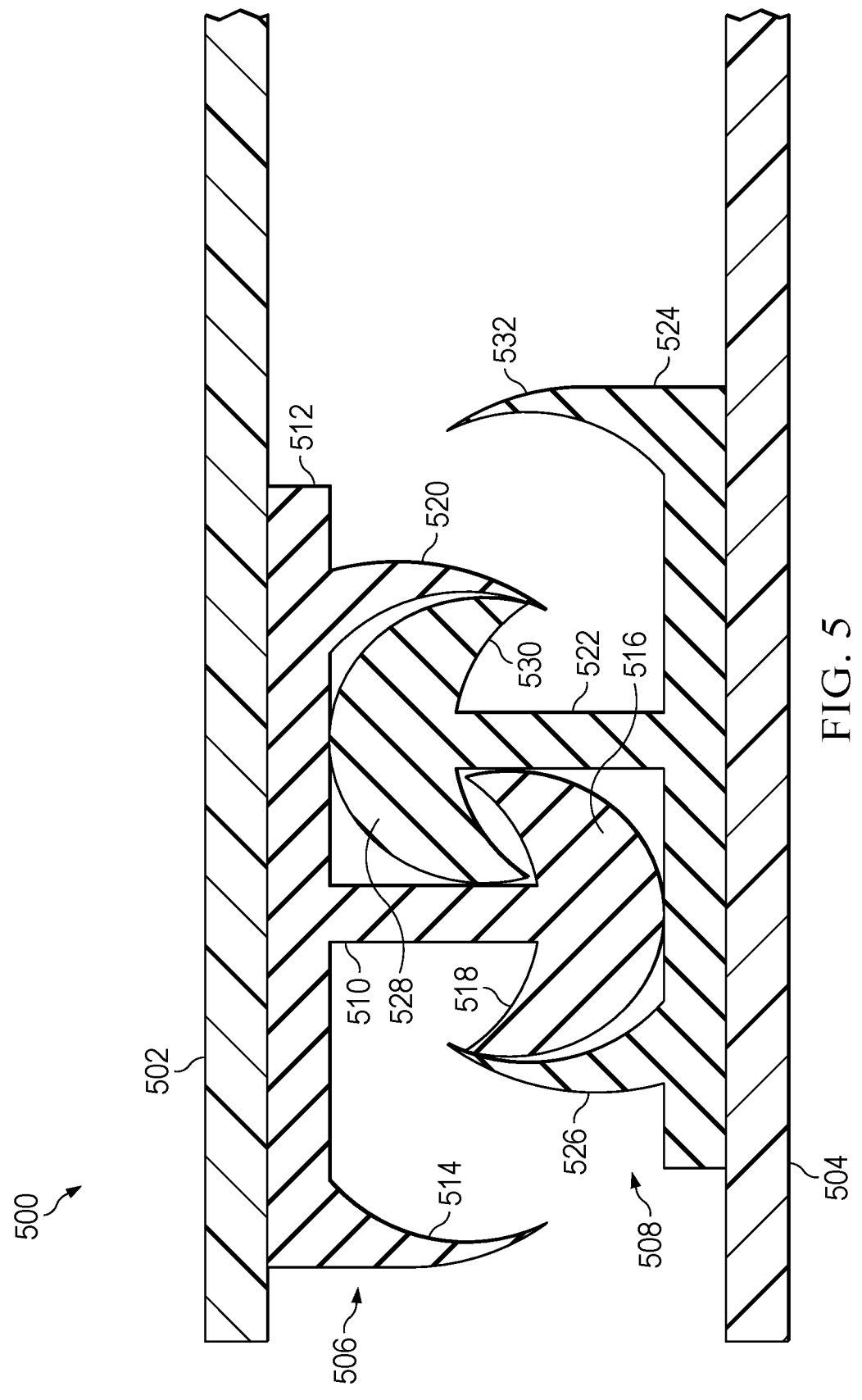
FIG. 5 is an illustration of a cross-sectional view of two interlocking strips in accordance with an illustrative embodiment.

Turning now to FIG. 5, an illustration of a cross-sectional view of two interlocking strips is depicted in accordance with an illustrative embodiment. In view 500, first interlocking strip 506 and second interlocking strip 508 are visible. Each of first interlocking strip 506 and second interlocking strip 508 is a physical implementation of any of first interlocking strip 210, second interlocking strip 214, mandrel interlocking strip 224, or bladder interlocking strip 234 of FIG. 2.

View 500 is a view of two interlocking strips having a same design. In view 500 first part 502 is sealed to second part 504 by first interlocking strip 506 and second interlocking strip 508. First interlocking strip 506 is connected to first part 502. First part 502 can take the form of a bagging sheet, an interface mold, a bladder, or a forming tool. Second part 504 can take the form of a bagging sheet, an interface mold, a bladder, or a forming tool. In one illustrative example, first part 502 is a bagging sheet while second part 504 is a forming tool. In another illustrative example, first part 502 is a bagging sheet or an interface mold while second part 504 is a bladder.

As depicted, first interlocking strip 506 comprises stem 510 extending outward from base 512. Base 512 can be bonded, such as by being heat welded or adhered, to first interlocking strip 506. Head 516 is connected to the end of stem 510. In this illustrative example, hook 518 extends outwardly from head 516. Rib 520 and rib 514 extend outwardly from base 512.

Second interlocking strip 508 comprises stem 522 terminating in head 528. Stem 522 extends outwardly from base 524. Base 524 is bonded to second part 504. Rib 532 and rib 526 extend outwardly from base 524. Hook 530 extends outwardly from head 528. Rib 532 and rib 526 are configured to engage a respective hook, such as hook 518. As depicted, rib 526 and head 528 form a mouth configured to receive head 516 of first interlocking strip 506. Rib 514 and rib 520 are configured to engage a respective hook, such as hook 530. As depicted, rib 520 and head 516 form a mouth configured to receive head 528 of second interlocking strip 508.

As depicted in FIG. 5, hook 518 is configured to engage and interlock with corresponding hook 530 of second interlocking strip 508. Hook 530 is configured to engage and interlock with corresponding hook 518 of first interlocking strip 506.

First interlocking strip 506 and second interlocking strip 508 are non-limiting examples of a type of interlocking strip with the same cross-section. In other illustrative examples, first interlocking strip 506 and second interlocking strip 508 can have different cross-sections. In some illustrative examples, a first interlocking strip and a second interlocking strip configured to seal with the first interlocking strip can have a same cross-section, but a different design not depicted in FIG. 5.

Figure 6:
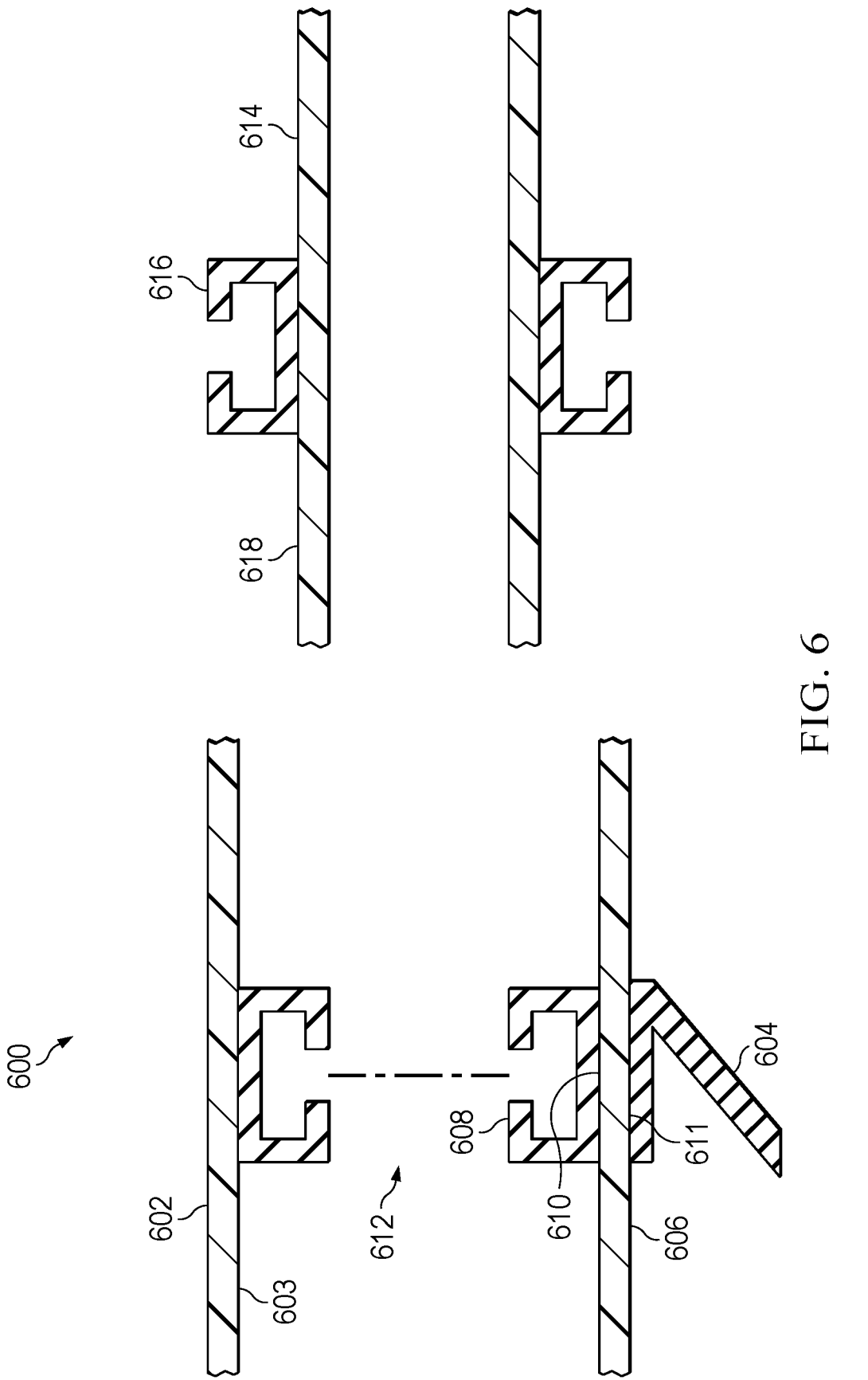
FIG. 6 is an illustration of a cross-sectional view of a bladder and a bagging sheet in accordance with an illustrative embodiment.

Turning now to FIG. 6, an illustration of a cross-sectional view of a bladder and a bagging sheet is depicted in accordance with an illustrative embodiment. bagging sheet 602 is a physical implementation of bagging sheet 208 of FIG. 2. Bladder 614 is a physical implementation of bladder 228 of FIG. 2.

View 600 is a view of bagging sheet 602 and bladder 614. Bagging sheet 602 comprises sealing surface 603. First interlocking strip 604 is connected to sealing surface 603 of bagging sheet 602. In some portions of first interlocking strip 604, first interlocking strip 604 is directly connected to sealing surface 603. In this view, second interlocking strip 608 indirectly connects first interlocking strip 604 to sealing surface 603.

First interlocking strip 604 forms a continuous perimeter connected to sealing surface 603. Second interlocking strip 608 is positioned between first interlocking strip 604 and sealing surface 603 of bagging sheet 602 in one portion of the perimeter. View 600 is a view of this portion of the perimeter.

Second interlocking strip 608 forms a continuous bladder perimeter. Second interlocking strip 608 is associated with a portion of sealing surface 603. In this illustrative example, second interlocking strip 608 is connected to bagging sheet

602. A portion of bagging sheet 602, portion 606, extends between second interlocking strip 608 and first interlocking strip 604. Second interlocking strip 608 is connected to surface 610 of portion 606. First interlocking strip 604 is connected to surface 611 of portion 606. Cavity 612 is formed by second interlocking strip 608. Cavity 612 is configured to receive bladder 614.

Bladder 614 has bladder interlocking strip 616 configured to connect to second interlocking strip 608. Bladder interlocking strip 616 is connected to exterior surface 618 of bladder 614. In this illustrative example, second interlocking strip 608 and bladder interlocking strip 616 have a same cross-sectional shape. The depiction of second interlocking strip 608 and bladder interlocking strip 616 is an example of only one non-limiting cross-section of interlocking strip.

Figure 7:
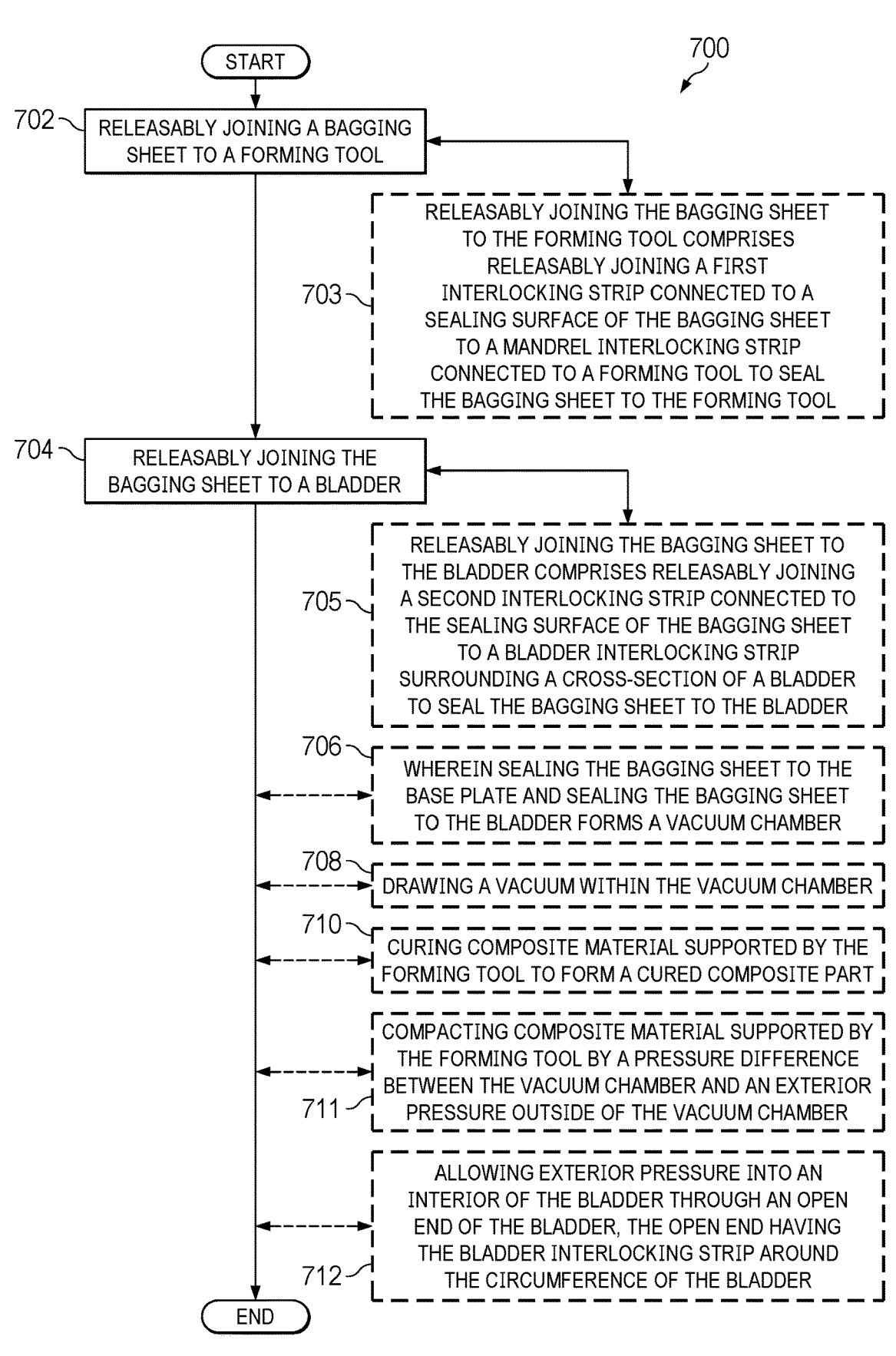
FIG. 7 is a flowchart of a method of vacuum bag sealing a composite part in accordance with an illustrative embodiment.

Turning now to FIG. 7, a flowchart of a method of vacuum bag sealing a composite part is depicted in accordance with an illustrative embodiment. Method 700 can be used to vacuum seal composite material prior to curing to form a portion of aircraft 100 of FIG. 1. Method 700 can be performed using first interlocking strip 210, mandrel interlocking strip 224, second interlocking strip 214, and bladder interlocking strip 234 of FIG. 2. Method 700 can be performed using bladder 304 and bagging sheet 302 of FIG. 3. Method 700 can be performed using bladder 404 and bagging sheet 402 of FIG. 4. Method 700 can be performed using first interlocking strip 506 and second interlocking strip 508 of FIG. 5. Method 700 can be performed using bladder 614 and bagging sheet 602 of FIG. 6.

Method 700 releasably joins a bagging sheet to a forming tool (operation 702). Method 700 releasably joins the bagging sheet to a bladder (operation 704). Afterwards, method 700 terminates.

In some illustrative examples, releasably joining the bagging sheet to the forming tool comprises releasably joining a first interlocking strip connected to a sealing surface of the bagging sheet to a mandrel interlocking strip connected to the forming tool to seal the bagging sheet to the forming tool (operation 703). In some illustrative examples, releasably joining the bagging sheet to the bladder comprises releasably joining a second interlocking strip connected to the sealing surface of the bagging sheet to a bladder interlocking strip surrounding a cross-section of a bladder to seal the bagging sheet to the bladder (operation 705).

In some illustrative examples, sealing the bagging sheet to the forming tool and sealing the bagging sheet to the bladder forms a vacuum chamber (operation 706). The vacuum chamber is a sealed volume between the bagging sheet and the forming surface of the forming tool. In some illustrative examples, method 700 draws a vacuum within the vacuum chamber (operation 708).

In some illustrative examples, method 700 cures composite material supported by the forming tool to form a cured composite part (operation 710). In some illustrative examples, curing the composite material comprises applying heat and pressure to the composite material. In some illustrative examples, curing the composite material is performed while the forming tool, bladder, and bagging sheet is positioned in an autoclave.

In some illustrative examples, method 700 compacts composite material supported by the forming tool by a pressure difference between the vacuum chamber and an exterior pressure outside of the vacuum chamber (operation 711). In some illustrative examples, method 700 allows exterior pressure into an interior of the bladder through an open end of the bladder, the open end having the bladder interlocking strip around the circumference of the bladder (operation 712).

Figure 8:
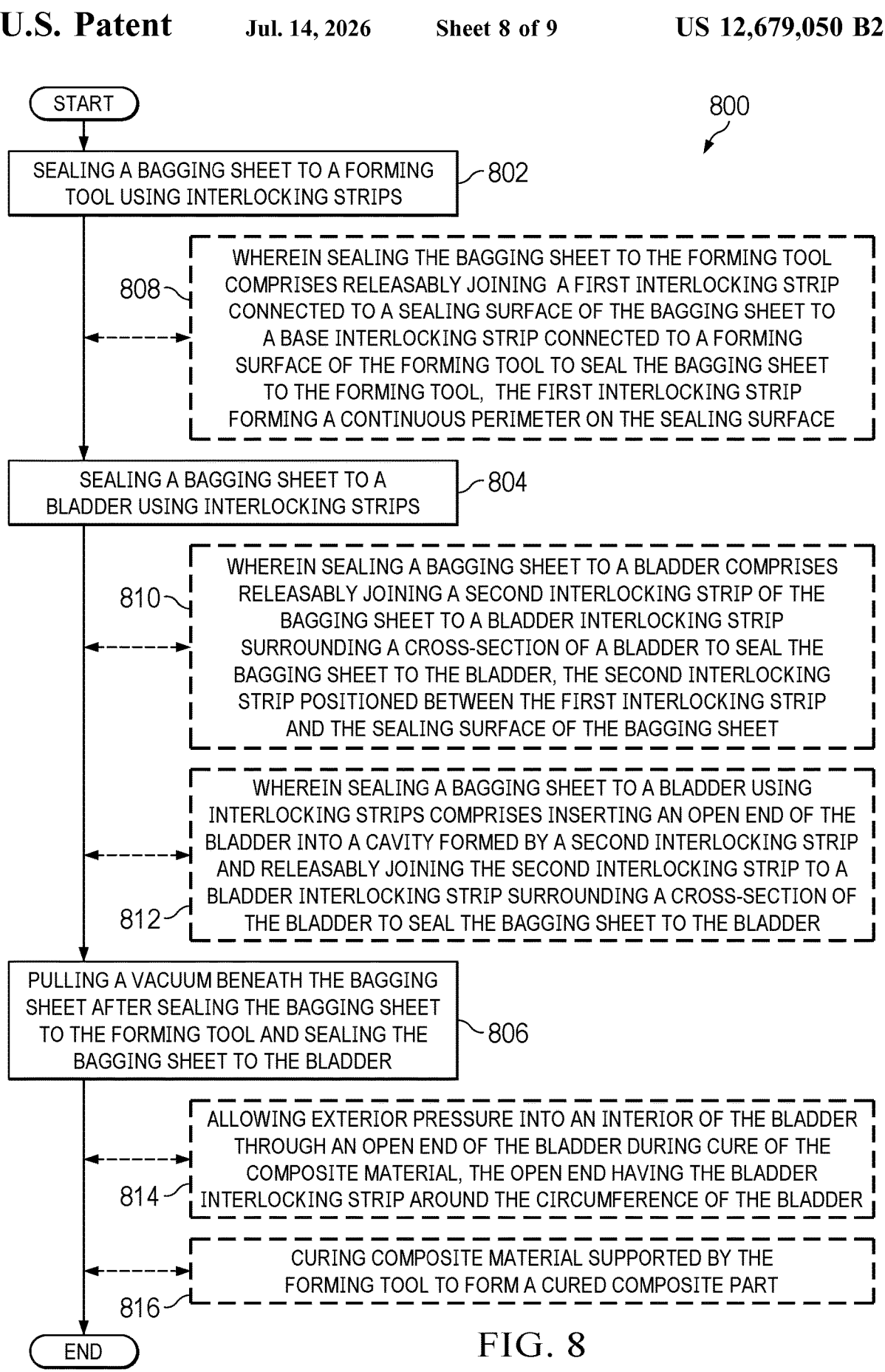
FIG. 8 is a flowchart of a method of vacuum bag sealing a composite part in accordance with an illustrative embodiment.

Turning now to FIG. 8, a flowchart of a method of vacuum bag sealing a composite part is depicted in accordance with an illustrative embodiment. Method 800 can be used to vacuum seal composite material prior to curing to form a portion of aircraft 100 of FIG. 1. Method 800 can be performed using first interlocking strip 210, mandrel interlocking strip 224, second interlocking strip 214, and bladder interlocking strip 234 of FIG. 2. Method 800 can be performed using bladder 304 and bagging sheet 302 of FIG. 3. Method 800 can be performed using bladder 404 and bagging sheet 402 of FIG. 4. Method 800 can be performed using first interlocking strip 506 and second interlocking strip 508 of FIG. 5. Method 800 can be performed using bladder 614 and bagging sheet 602 of FIG. 6.

Method 800 seals a bagging sheet to a forming tool using interlocking strips (operation 802). Method 800 seals a bagging sheet to a bladder using interlocking strips (operation 804). Method 800 pulls a vacuum beneath the bagging sheet after sealing the bagging sheet to the forming tool and sealing the bagging sheet to the bladder (operation 806). Afterwards, method 800 terminates.

In some illustrative examples, sealing the bagging sheet to the forming tool comprises releasably joining a first interlocking strip connected to a sealing surface of the bagging sheet to a mandrel interlocking strip connected to a forming surface of the forming tool to seal the bagging sheet to the forming tool, the first interlocking strip forming a continuous perimeter on the sealing surface (operation 808). In some illustrative examples, a cross-sectional shape of the first interlocking strip is the same as a cross-sectional shape of the mandrel interlocking strip. In some illustrative examples, a cross-sectional shape of the first interlocking strip is different from a cross-sectional shape of the mandrel interlocking strip. In some illustrative examples, a cross-sectional shape of the first interlocking strip is constant along the entirety of the continuous perimeter. In some illustrative examples, the first interlocking strip can have more than one cross-sectional shape within the continuous perimeter.

In some illustrative examples, sealing a bagging sheet to a bladder comprises releasably joining a second interlocking strip of the bagging sheet to a bladder interlocking strip surrounding a cross-section of a bladder to seal the bagging sheet to the bladder, the second interlocking strip positioned between the first interlocking strip and the sealing surface of the bagging sheet (operation 810). In some illustrative examples, a cross-sectional shape of the second interlocking strip is the same as a cross-sectional shape of the bladder interlocking strip. In some illustrative examples, a cross-sectional shape of the second interlocking strip is different from a cross-sectional shape of the bladder interlocking strip. In some illustrative examples, a cross-sectional shape of the second interlocking strip is constant. In some illustrative examples, the second interlocking strip can have more than one cross-sectional shape.

In some illustrative examples, sealing a bagging sheet to a bladder using interlocking strips comprises inserting an open end of the bladder into a cavity formed by a second interlocking strip and releasably joining the second interlocking strip to a bladder interlocking strip surrounding a cross-section of the bladder to seal the bagging sheet to the bladder (operation 812). In other illustrative examples, the second interlocking strip can be separable. In these illustrative examples, the second interlocking strip can be releasably joined to form the cavity after releasably connecting the bladder to at least a portion of the second interlocking strip.

In some illustrative examples, method 800 allows exterior pressure into an interior of the bladder through an open end of the bladder during cure of the composite material, the open end having the bladder interlocking strip around the circumference of the bladder (operation 814). In some illustrative examples, the exterior pressure is a pressure within an autoclave. In some illustrative examples, method 800 cures composite material supported by the forming tool to form a cured composite part (operation 816).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, each of operation 703, and operation 705 through operation 712 may be optional. As another example, operation 808 through operation 816 may be optional.

Figure 9:
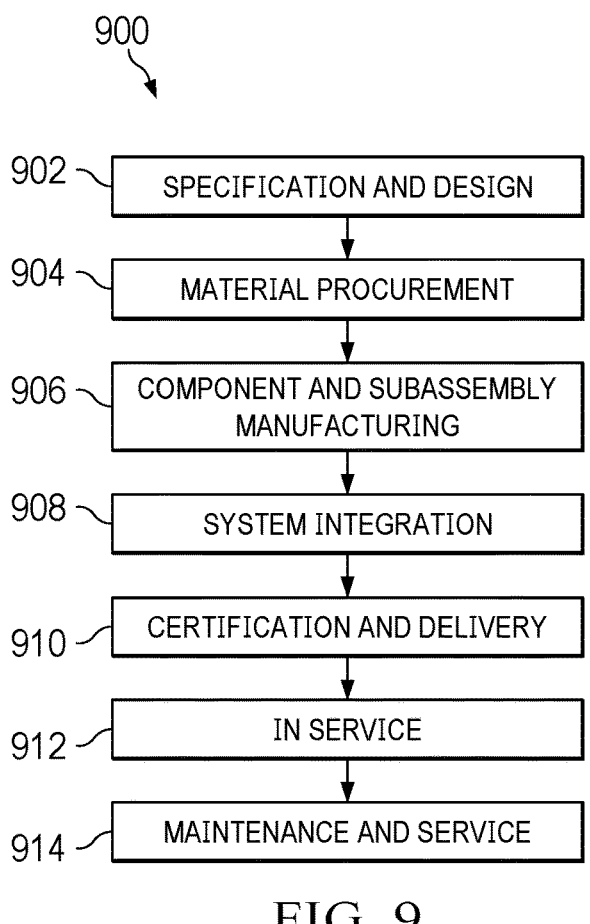
FIG. 9 is an illustration of an aircraft manufacturing and service method in a form of a block diagram in accordance with an illustrative embodiment.
Figure 10:
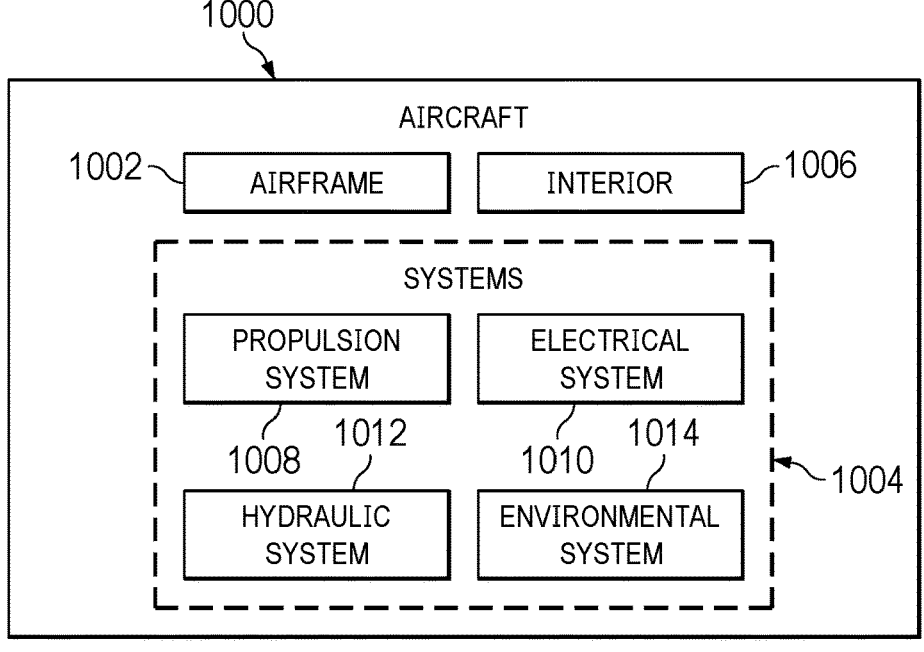
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in a form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vacuum bag sealing system comprising:
a bagging sheet comprising a sealing surface;
a first interlocking strip connected to the sealing surface of the bagging sheet;
a material coupled to a portion of the sealing surface of the bagging sheet, the material defining an inner most surface;
a second interlocking strip coupled to the inner most surface, the second interlocking strip forming a continuous bladder perimeter inside the material;
a bladder configured to provide compression to a composite material during curing; and
a bladder interlocking strip connected to an outer surface of the bladder and surrounding a circumference of the bladder, the bladder interlocking strip and the second interlocking strip configured to join the bagging sheet and the bladder along an entirety of the circumference of the bladder to seal the bagging sheet against the bladder.

2. The vacuum bag sealing system of claim 1 further comprising:
a forming tool; and
a mandrel interlocking strip connected to a forming surface of the forming tool, the mandrel interlocking strip and the first interlocking strip configured to join the bagging sheet and the forming tool to seal the bagging sheet against the forming tool.

3. The vacuum bag sealing system of claim 1, wherein the first interlocking strip comprises a first cross-sectional shape, and wherein the first cross-sectional shape is configured to interlock with a mandrel interlocking strip connected to a forming tool.

4. The vacuum bag sealing system of claim 3, wherein the second interlocking strip comprises a second cross-sectional shape, and wherein the second cross-sectional shape is configured to interlock with the bladder interlocking strip.

5. The vacuum bag sealing system of claim 4, wherein the first cross-sectional shape is different from the second cross-sectional shape.

6. The vacuum bag sealing system of claim 3, wherein the first cross-sectional shape and a third cross-sectional shape of the mandrel interlocking strip are the same.

7. The vacuum bag sealing system of claim 4, wherein the second cross-sectional shape and a fourth cross-sectional shape of the bladder interlocking strip are the same.

8. The vacuum bag sealing system of claim 4, wherein one of the second cross-sectional shape or a fourth cross-sectional shape of the bladder interlocking strip comprises a stem and a head disposed at an end of the stem.

9. The vacuum bag sealing system of claim 1, wherein the second interlocking strip forms a cavity having a cross-sectional shape the same as a cross-sectional shape of the bladder.

10. A method for vacuum bag sealing a composite part comprising:
releasably joining a bagging sheet to a forming tool; and
releasably joining the bagging sheet to a bladder configured to provide compression to a composite material during curing,
wherein a first interlocking strip is connected to a sealing surface of the bagging sheet,
wherein a material is coupled to a portion of the sealing surface of the bagging sheet, the material defining an inner most surface,
wherein a second interlocking strip is coupled to the inner most surface, the second interlocking strip forms a continuous bladder perimeter inside the material, and
wherein releasably joining the bagging sheet to the bladder comprises releasably joining the second interlocking strip connected to the sealing surface of the bagging sheet to a bladder interlocking strip connected to an outer surface of the bladder and surrounding a circumference of the bladder to join the bagging sheet and the bladder along an entirety of the circumference of the bladder to seal the bagging sheet to the bladder.

11. The method of claim 10, wherein:
releasably joining the bagging sheet to the forming tool comprises releasably joining the first interlocking strip connected to the sealing surface of the bagging sheet to a mandrel interlocking strip connected to a forming surface of the forming tool to seal the bagging sheet to the forming tool.

12. The method of claim 11, wherein sealing the bagging sheet to the forming tool and sealing the bagging sheet to the bladder forms a vacuum chamber, and further comprising:
drawing a vacuum within the vacuum chamber.

13. The method of claim 12 further comprising:
curing composite material supported by the forming tool to form a cured composite part.

14. The method of claim 12 further comprising:
compacting composite material supported by the forming tool by a pressure difference between the vacuum chamber and an exterior pressure outside of the vacuum chamber.

15. The method of claim 12 further comprising:

allowing exterior pressure into an interior of the bladder through an open end of the bladder, the open end having the bladder interlocking strip around the circumference of the bladder.

16. A method for vacuum bag sealing a composite part comprising:

sealing a bagging sheet to a forming tool using interlocking strips;

sealing the bagging sheet to a bladder using interlocking strips, the bladder configured to provide compression to a composite material during curing; and pulling a vacuum beneath the bagging sheet after sealing the bagging sheet to the forming tool and sealing the bagging sheet to the bladder, wherein a first interlocking strip of the interlocking strips is connected to a sealing surface of the bagging sheet, wherein a material is coupled to a portion of the sealing surface of the bagging sheet, the material defining an inner most surface, wherein a second interlocking strip of the interlocking strips is coupled to the inner most surface, the second interlocking strip forms a continuous bladder perimeter inside the material, and wherein sealing the bagging sheet to the bladder comprises releasably joining the second interlocking strip of the bagging sheet to a bladder interlocking strip connected to an outer surface of the bladder and surrounding a circumference of the bladder, the bladder interlocking strip and the second interlocking strip configured to join the bagging sheet and the bladder along an entirety of the circumference of the bladder to seal the bagging sheet to the bladder, the second interlocking strip positioned between the first interlocking strip and the sealing surface of the bagging sheet.

17. The method of claim 16, wherein sealing the bagging sheet to the forming tool comprises releasably joining the first interlocking strip connected to the sealing surface of the bagging sheet to a mandrel interlocking strip connected to a forming surface of the forming tool to seal the bagging sheet to the forming tool.

18. The method of claim 16 further comprising:

curing composite material supported by the forming tool to form a cured composite part.

19. The method of claim 18 further comprising:

allowing exterior pressure into an interior of the bladder through an open end of the bladder during cure of the composite material, the open end having the bladder interlocking strip around the circumference of the bladder.

20. The method of claim 16, wherein sealing the bagging sheet to the bladder using the interlocking strips comprises inserting an open end of the bladder into a cavity formed by the second interlocking strip and releasably joining the second interlocking strip to the bladder interlocking strip.

* * * * *